United States Patent
Lee et al.

(10) Patent No.: US 8,420,713 B2
(45) Date of Patent: *Apr. 16, 2013

(54) CAPSULATED COLORANT, METHOD OF PREPARING THE SAME, AND INK COMPOSITION INCLUDING THE CAPSULATED COLORANT

(75) Inventors: Jong-In Lee, Suwon-si (KR); Seoung-Min Ryu, Gunpo-si (KR); Jae-Yoon Jung, Suwon-si (KR); Sang-Eun Shim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 518 days.

This patent is subject to a terminal disclaimer.

(21) Appl. No.: 12/270,438

(22) Filed: Nov. 13, 2008

(65) Prior Publication Data

US 2009/0292069 A1 Nov. 26, 2009

(30) Foreign Application Priority Data

May 20, 2008 (KR) .......................... 10-2008-0046592

(51) Int. Cl.
*C09D 11/00* (2006.01)

(52) U.S. Cl.
USPC ........... 523/160; 347/100; 523/161; 523/200; 523/205; 524/548; 524/555; 524/556; 524/558

(58) Field of Classification Search ............... 106/31.45, 106/31.58, 31.75, 31.86; 347/100; 523/160, 523/161, 200, 205; 524/555, 556, 558, 560, 524/548

See application file for complete search history.

(56) References Cited

U.S. PATENT DOCUMENTS

| | | | |
|---|---|---|---|
| 3,806,464 A | 4/1974 | Matrick et al. | |
| 3,876,603 A | 4/1975 | Makhlouf | |
| 4,036,652 A | 7/1977 | Rothmayer | |
| 5,272,201 A | 12/1993 | Ma et al. | |
| 5,661,197 A * | 8/1997 | Villiger et al. ................ | 523/161 |
| 5,889,083 A | 3/1999 | Zhu | |
| 6,455,220 B1 | 9/2002 | Cheng | |
| 6,498,203 B1 | 12/2002 | Kito et al. | |
| 6,864,302 B2 | 3/2005 | Miyabayashi | |
| 6,877,850 B2 | 4/2005 | Ishimoto et al. | |
| 6,916,862 B2 | 7/2005 | Ota et al. | |
| 7,074,843 B2 | 7/2006 | Nakamura et al. | |
| 7,442,244 B2 * | 10/2008 | Ishihara ..................... | 106/31.58 |
| 7,521,085 B2 * | 4/2009 | Hall et al. ................. | 427/213.34 |
| 2002/0193514 A1 * | 12/2002 | Wang et al. .................. | 524/853 |
| 2003/0029355 A1 | 2/2003 | Miyabayashi | |
| 2003/0069329 A1 | 4/2003 | Kubota et al. | |
| 2003/0145761 A1 | 8/2003 | Redfearn et al. | |
| 2005/0004263 A1 | 1/2005 | Gould et al. | |
| 2005/0176847 A1 | 8/2005 | Cagle | |
| 2005/0276774 A1 | 12/2005 | Elder et al. | |
| 2007/0129462 A1 | 6/2007 | Ma | |
| 2007/0129463 A1 | 6/2007 | Ma | |
| 2007/0219291 A1 * | 9/2007 | Doi et al. ..................... | 523/160 |
| 2008/0026221 A1 | 1/2008 | Vincent et al. | |
| 2008/0269374 A1 | 10/2008 | Ganapathiappan | |
| 2009/0025601 A1 | 1/2009 | Vasudevan et al. | |

FOREIGN PATENT DOCUMENTS

| | | |
|---|---|---|
| JP | 07-048539 | 2/1995 |
| JP | 07-316489 | 12/1995 |
| JP | 11-005923 | 1/1999 |
| KR | 10-2002-0036767 | 5/2002 |

OTHER PUBLICATIONS

English language abstract of KR 10-2002-0036767, published May 16, 2002.
English language abstract of JP 07-316489, published Dec. 5, 1995.
Machine English language translation of JP 07-316489, published Dec. 5, 1995.
English language abstract of JP 07-048539, published Feb. 12, 1995.
Machine English language translation of JP 07-048539, published Feb. 12, 1995.
English language abstract of JP 11-005923, published Jan. 18, 1999.
Machine English language translation of JP 11-005923, published Jan. 18, 1999.
Office Action issued in U.S. Appl. No. 12/346,249, mailed Apr. 29, 2009.
Office Action issued in U.S. Appl. No. 12/346,249 mailed Nov. 20, 2009.
Office Action issued in U.S. Appl. No. 12/169,780 mailed May 1, 2009.
Office Action issued in U.S. Appl. No. 12/169,780 mailed Nov. 27, 2009.
Office Action issued in U.S. Appl. No. 12/177,908 mailed Apr. 29, 2009.
Office Action issued in U.S. Appl. No. 12/177,908 mailed Nov. 23, 2009.
Office Action issued in U.S. Appl. No. 12/198,323 mailed Apr. 29, 2009.
Office Action issued in U.S. Appl. No. 12/198,323 mailed Nov. 6, 2009.
Notice of Allowance issued in U.S. Appl. No. 12/346,249 mailed Sep. 6, 2012.
Office Action issued in U.S. Appl. No. 12/346,249 mailed Jun. 26, 2012.
Office Action issued in U.S. Appl. No. 12/346,249 mailed Jan. 12, 2012.

\* cited by examiner

*Primary Examiner* — David W Wu
*Assistant Examiner* — Marie Reddick
(74) *Attorney, Agent, or Firm* — Staas & Halsey LLP

(57) ABSTRACT

Provided are a capsulated colorant, a method of preparing same and ink compositions including the capsulated colorant. The capsulated colorant includes a colorant and a polymer resin coated on the colorant. The polymer resin is a result of polymerization of a polymerizable composition comprising a basic monomer and a polymerizable unsaturated monomer. The ink composition comprises the colorant coated with the polymeric resin and a solvent, which may be water and at least one organic solvent.

10 Claims, 11 Drawing Sheets

CAPSULATED COLORANT, METHOD OF PREPARING THE SAME, AND INK COMPOSITION INCLUDING THE CAPSULATED COLORANT

CROSS-REFERENCE TO RELATED PATENT APPLICATION

This application claims the benefit of Korean Patent Application No. 10-2008-0046592, filed on May 20, 2008. in the Korean Intellectual Property Office, the disclosure of which is incorporated by reference herein in its entirety.

TECHNICAL FIELD

This disclosure relates to ink. In particular, it is a capsulated colorant, a method of preparing the same, and an ink composition including the capsulated colorant.

BACKGROUND

In inkjet printers, a coloring agent is generally defined as a material that exhibits a unique color by selectively absorbing or reflecting visible light. Coloring agents can be divided generally, into dyes and pigments.

A dye is a coloring agent that is printed on and absorbed into a material such as fiber, leather, fur, paper, or the like, so that the printed material has color fastness with respect to light, rubbing, and the like. A pigment is a micro particle having a coloring agent, and is not directly absorbed into but is instead adhered to the surface of a material using a physical method, such as adhesion or the like, so that the printed material has a unique color.

Dyes are mixed and dissolved in solvents such as water; or the like, but pigments are generally not dissolved in the solvents. Therefore, a crucial aspect for forming pigments is to uniformly disperse pigment particulates in solvents and thereby, allow the formed dispersed state to remain stable permanently without re-aggregation.

Water-soluble dye-type ink is superior in terms of long-term storage stability, it keeps its uniformity and has good color clarity and brightness. However, this ink may be poor in waterfastness, lightfastness, etc.

Pigment type ink has high optical density (OD), good waterfastness and lightfastness, and little bleeding among colors. However, this ink has poorer color tone clarity and has weaker stability in terms of long-tern storage than the dye-type ink. In addition, images which are printed using the pigment type ink have poor dryfastness and wetfastness; that is, they have poor rubfastness.

Also, when printing in color (multicolor printing) with dyes or pigments, bleeding may occur at interfaces of the colors, thereby reducing clearness of printed images.

To enhance the rubfastness, resin has been added to ink. However, the viscosity of ink may be increased as a result. To prevent the increase in the viscosity of ink, resin particles have been added. However, because resin particles and pigments are separately dispersed in an ink formed using these methods, this may not be sufficient.

A capsulated coloring agent improves the performance of printed images, including characteristics such as rubfastness, waterfastness, and the like. However, a greater concentration of polymer resins may be generated in an aqueous solution during the capsulation process. Thus, the capsulated coloring agent may clog a nozzle surface when used in an ink cartridge. In addition, during long periods of storage, physical properties of the ink may change, such as an increase in the viscosity of the ink due to the polymer resin in the aqueous solution.

There is a need for an ink composition which has excellent storage stability like water-soluble dye-type ink, has excellent waterfastness like pigment type ink, and also has improved printed gloss and rubfastness. There is also a need for improving properties of an ink composition by modifying a colorant used therein.

SUMMARY

We provide a capsulated colorant used in an ink composition which can maintain stabilized physical properties of ink for a long period of time. As a degree of polymerization of a polymer resin that coats the colorant on a surface of a colorant increases, production of the polymer resin that does not participate in coating the colorant in an aqueous solution is prevented, which can reduce nozzle clogging of ink when used in an ink cartridge. This improves reliability of ink, such as improved waterfastness, lightfastness, rubfastness, and optical density.

The capsulated colorant comprises: a colorant, and a polymer resin coated on the colorant, wherein the polymer resin is a result of polymerization of a polymerizable composition comprising a basic monomer and a polymerizable unsaturated monomer.

There is also provided a method of preparing a capsulated colorant, the method comprising: emulsifying a polymerization composition comprising a polymerizable unsaturated monomer, a basic monomer, an aqueous medium, a colorant, an emulsifying agent, and a polymerization initiator; and polymerizing the polymerizable unsaturated monomer and the basic monomer on the colorant to form a polymer resin that is coated on the colorant.

There is also provided an ink composition comprising the capsulated colorant.

There is also provided an ink set comprising at least two ink compositions comprising the capsulated colorant.

There is also provided a cartridge for an inkjet recording device, comprising the ink set.

There is also provided an inkjet recording device comprising the cartridge for an inkjet recording device.

BRIEF DESCRIPTION OF THE DRAWINGS

The above and other features and advantages will become more apparent by describing in detail with reference to the attached drawings in which.

DETAILED DESCRIPTION OF THE DRAWINGS

Figure 1:
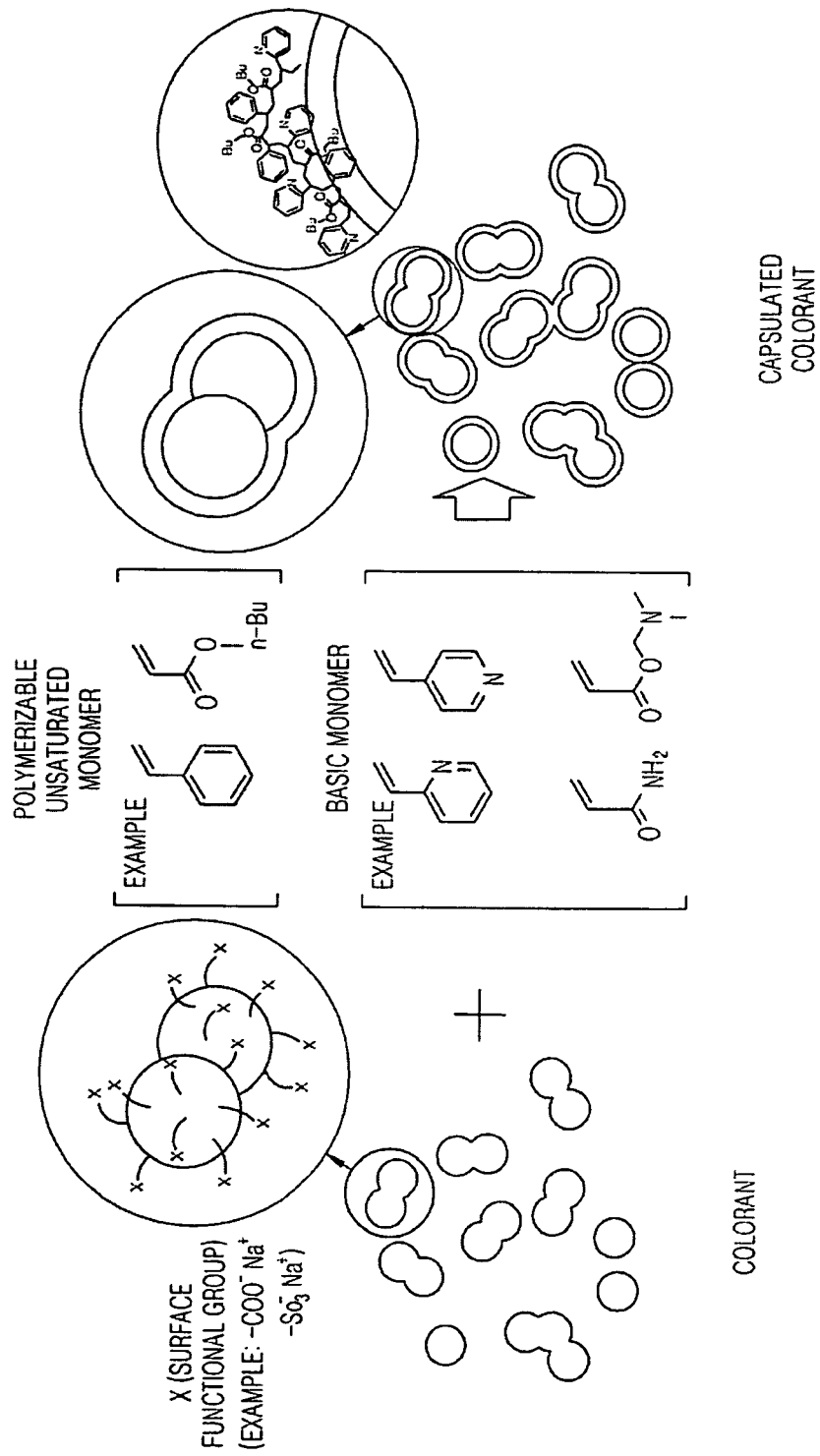
FIG. 1 is a flowchart showing a process of coating a colorant with a basic monomer.

It will be appreciated that the following description is intended to refer to specific examples of structure selected for illustration in the drawings and is not intended to define or limit the disclosure, other than in the appended claims.

Provided is a capsulated colorant comprising: a colorant; and a polymer resin, which is coated on the colorant.

FIG. 1 is a flowchart explaining a process of coating a colorant with a basic monomer. Referring to FIG. 1, a surface functional group X of the colorant and a basic monomer/polymerizable unsaturated monomer are polymerized to prepare a capsulated colorant. The polymerizable unsaturated monomer may be styrene or n-butyl acrylate, and the basic monomer may be 2-vinylpyrrolidone, 4-vinylpyrrolidone, acrylamide, or N,N-dimethylaminoethylmetacrylate, but is not limited thereto.

Referring to FIG. 1, a self-dispersing pigment with a hydrophilic ionic group bound to a surface thereof is used as the colorant in order to be effectively dispersed in an ink, and thus a surface of the colorant is negatively charged. When a polymerization composition including a basic monomer having a positive charge is added to the colorant, reaction efficiency on the surface of the colorant is increased due to electrostatic attraction between the colorant and the basic monomer. Thus, the surface of the colorant can be effectively coated with polymer resin. As a result, the amount of the polymer resin that does not coat the colorant, but is polymerized independently can be decreased significantly.

The colorant may be any dye and pigment used in the art without limitation. That is, the colorant may be a direct dye, an acid dye, a food dye, an alkaline dye, a reactive dye, a disperse dye, an oil-based dye, any kind of pigment, a self-disperse pigment, or mixtures thereof.

Examples of the dye used for the colorant may include food black dyes, food red dyes, food yellow dyes, food blue dyes, acid black dyes, acid red dyes, acid blue dyes, acid yellow dyes, direct black dyes, direct blue dyes, direct yellow dyes, anthraquinone dyes, monoazo dyes, disazo dyes, a phthalocyanine derivatirve, and the like. Examples of the pigment used for the colorant may include carbon black, graphite, vitreous carbon, activated charcoals, activated carbons, anthraquinone, phthalocyanine blue, phthalocyanine green, diazos, monoazos, pyranthrones, perylene, quinacridone, indigoid pigments, and the like. Examples of the self-dispersing pigment may include cabojet-series, CW-series from Orient Chemical, and the like, but is not limited to thereto.

The polymer resin coated on the colorant may be prepared by polymerizing a composition including the basic monomer and the polymerizable unsaturated monomer. The basic monomer may contain at least one chemical structure selected from the group consisting of amine, amide, azole, pyridine, and pyrrolidone. In particular, the basic monomer may be acrylamide (AAm), methacrylamide, N,N-dimethylaminoethyl methacrylate (DMAEMA), 2-vinylpyridine (2-vp), 4-vinylpyridine (4-vp), N-vinylpyrrolidone, 1-vinylimidazole, vinyl-N-methylpyridinium chloride 9-vinylcabazole, or the like.

The polymerizable unsaturated monomer can be at least one monomer selected from the group consisting of: a compound having at least two double bonds, unsaturated carboxylic acid, cyanide vinyl monomer, unsaturated carboxylic alkylester, unsaturated carboxylic hydroxyalkyl ester, unsaturated carboxylic amide and its derivative, aromatic vinyl monomer, methyl vinyl ketone, and vinylidene chloride.

In particular, the compound having at least two double bonds may be at least one of butadiene, pentadiene, and the like. The unsaturated carboxylic acid may be at least one selected from the group consisting of methacrylic acid, acrylic acid, itagonic acid, crotonic acid, furumalic acid, and maleic acid. The unsaturated polycarboxylic alkylester may be at least one compound selected from the group consisting of itaconic acid monoethyl ester, fumaric acid monobutyl ester, and maleic acid monobutyl ester. The cyanide vinyl monomer may be acrylonitrile or methacrylonitrile. The unsaturated carboxylic amide may be acrylamide, methacrylamide, itaconamide, maleic monoamide, or a derivative thereof. In addition, the aromatic vinyl monomer may be at least one monomer selected from the group consisting of α-methylstyrene, vinyltoluene, or P-methylstyrene.

Also provided is a method of preparing a capsulated colorant, including: emulsifying a polymerization composition comprising a polymerizable unsaturated monomer, a basic monomer, an aqueous medium, a colorant, an emulsifying agent, and a polymerization initiator; and polymerizing the polymerizable unsaturated monomer and the basic monomer on the colorant to form a polymer resin which is coated on the colorant.

The basic monomer may contain at least one chemical structure selected from the group consisting of: amine, amide, azole, pyridine, and pyrrolidone in molecules.

The polymerizable unsaturated monomer may be, as described above, at least one monomer selected from the group consisting of: a compound having at least two double bonds, unsaturated carboxylic acid, cyanide vinyl monomer, unsaturated carboxylic alkylester, unsaturated carboxylic hydroxyalkyl ester, unsaturated carboxylic amide and its derivative, aromatic vinyl monomer, methyl vinyl ketone, and vinylidene chloride.

The amount of basic monomer may be 1-80 parts by weight, and preferably 10-50 parts by weight, with respect to 100 parts by weight of the polymerizable unsaturated monomer. When the amount of basic monomer is less than 1 part by weight with respect to 100 parts by weight of the polymerizable unsaturated monomer, electrostatic interaction between the basic monomer and the colorant may be so weak that interactions cannot occur, and thus the amount of the polymer resin in an aqueous solution increases. When the amount of basic monomer is greater than 80 parts by weight with respect to 100 parts by weight of the polymerizable unsaturated monomer, electrostatic interaction between the basic monomer and the colorant may be so strong that particles of the colorant bind with each other, resulting in an increase in particle size.

The aqueous medium may be water or a mixed solution of water and an organic solvent. The amount of aqueous medium may be 500-5,000 parts by weight, and preferably 1,500-3,000 parts by weight, with respect to 100 parts by weight of the polymerizable unsaturated monomer. When the amount of aqueous medium is less than 500 parts by weight with respect to 100 parts by weight of the polymerizable unsaturated monomer, a polymerization reaction may be so fast that a coated polymer resin becomes too thick. When the amount of the aqueous medium is greater than 5,000 parts by weight with respect to 100 parts by weight of the polymerizable unsaturated monomer, it may be difficult for the polymerizable unsaturated monomer to move to each reaction site, and thus a polymerization reaction is so slow that a polymer resin cannot be coated on the colorant.

The colorant may be, as described above, a direct dye, an acid dye, a food dye, an alkaline day, a reactive dye, a disperse dye, an oil-based dye, any kind of pigment, a self-disperse pigment, or mixtures thereof.

The amount of colorant may be 10-500 parts by weight, and preferably 20-300 parts by weight, with respect to 100 parts by weight of the polymerizable unsaturated monomer. When the amount of colorant is less than 10 parts by weight with respect to 100 parts by weight of the polymerizable unsaturated monomer, the amount of polymer resin coated on the colorant may be too high. Thus, the amount of the polymer resin that does not coat the colorant, but is polymerized independently, increases resulting in poor storage stability of an ink composition including the capsulated colorant. When the amount of the colorant is greater than 500 parts by weight with respect to 100 parts by weight of the polymerizable unsaturated monomer, the amount of polymer resin coated on the colorant may be too small. Thus, a capsulation degree of the colorant is small, resulting in poor fixability of the capsulated colorant and the like.

The emulsifying agent may be a non-ionic emulsifying agent, an anionic emulsifying agent, or an ampholytic emulsifying agent.

The amount of emulsifying agent may be 0.1-20 parts by weight, and preferably 1-10 parts by weight, with respect to 100 parts by weight of the polymerizable unsaturated monomer. When the amount of emulsifying agent is less than 1 part by weight with respect to 100 parts by weight of the polymerizable unsaturated monomer, it is less than a critical emulsification concentration, and thus emulsification polymerization may be inefficient. When the amount of the emulsifying agent is greater than 20 parts by weight with respect to 100 parts by weight of the polymerizable unsaturated monomer, a large amount of bubbles may be generated even after the emulsification polymerization reaction is terminated due to excessive use of the emulsifying agent.

A method of emulsification may be direct emulsification, in which the colorant dispersed in the basic monomer and the polymerizable unsaturated monomer is emulsified in an aqueous medium with an emulsifying agent added using a mixer such as a homo mixer, a line mixer, high pressure homogenizer, or the like. Emulsification may be natural emulsification in which an emulsifying agent is added to the colorant dispersed in the polymerizable unsaturated monomer, and then the mixture is poured into a large amount of water. In addition, the method of emulsification may be phase inversion emulsification in which an emulsifying agent is added to the colorant dispersed in the basic monomer and the polymerizable unsaturated monomer, and then water is added little by little to the mixture while the mixture is stirred.

The polymerization initiator may be water-soluble or fat-soluble persulfate, peroxide, an azo compound, or peroxide and a reducing agent, for example, a redox composition in combination of sulfite. Examples of the polymerization initiator may include ammonium persulfate, potassium persulfate, sodium persulfate, hydrogen peroxide, t-butyl hydroperoxide, t-butyl peroxybenzoate, 2,2-azobis-isobutyronitrile, 2,2-azobis(2-diaminopropane)hydrochloride, 2,2-azobis(2,4-dimethylvaleronitrile), and the like.

The amount of polymerization initiator may be 0.1-10 parts by weight, and preferably 0.5-5 parts by weight, with respect to 100 parts by weight of the polymerizable unsaturated monomer. When the amount of polymerization initiator is less than 0.1 parts by weight with respect to 100 parts by weight of the polymerizable unsaturated monomer, a reaction may not be satisfactorily initiated, and thus the reaction occurs too slowly. When the amount of polymerization initiator is greater than 10 parts by weight with respect to 100 parts by weight of the polymerizable unsaturated monomer, a reaction speed may be so fast that the reaction cannot be controlled.

The polymerization initiator may be added in an early stage of a reaction together with other materials which are to participate in the polymerization reaction. This may include a polymerizable unsaturated monomer, an aqueous medium, a colorant, a cross-linkable monomer, and an emulsifying agent. Alternatively, after the other materials are first emulsified and a temperature of the resultant is raised, the polymerization initiator may be added. At this time, it may be difficult to adjust a speed of the polymerization reaction in the former case, whereas it is easy to adjust a speed of the polymerization reaction in the latter case.

If necessary, the polymerization composition may further include an additive, for example, a UV absorber, an anti-oxidant, a color developer, a chain transfer agent, and the like.

An extent of cross-linking of the polymer resin constituting the capsulated colorant may be adjusted by controlling an amount and injection method of the chain transfer agent.

Also provided is an ink composition including the capsulated colorant, an organic solvent and water.

In the ink composition, the amount of capsulated colorant may be 1-20 parts by weight. Preferably, it is 2-10 parts by weight. More preferably, it is 3-6 parts by weight, with respect to 100 parts by weight of the ink composition. When the amount of capsulated colorant is less than 1 part by weight with respect to 100 parts by weight of the ink composition, a desired optical density may not be realized. When the amount of capsulated colorant is greater than 20 parts by weight with respect to 100 parts by weight of the ink composition, the viscosity of the ink composition may be too high, and thus ejection performance of the ink composition is degraded.

The solvent used in the ink composition can be a water-based solvent such as water, and may further include at least one organic solvent. The amount of solvent may be 80-99 parts by weight, preferably 83-95 parts by weight, and more preferably 85-90 parts by weight, with respect to 100 parts by weight of the ink composition.

When the amount of solvent is less than 80 parts by weight with respect to 100 parts by weight of the ink composition, the viscosity of the ink composition may be excessively high so that the ejection performance is degraded. When the amount of the solvent is greater than 99 parts by weight with respect to 100 parts by weight of the ink composition, the surface tension of the ink composition may be increased so that the ejection performance is degraded.

The organic solvent included in the solvent may be at least one solvent selected from the group consisting of: a monohydric alcohol-based solvent, a ketone-based solvent, an ester-based solvent, a polyhydric alcohol-based solvent, a nitrogen-containing solvent, and a sulfur-containing solvent.

The monohydric alcohol-based solvent which can be used as the organic solvent may be methyl alcohol, ethyl alcohol, n-propyl alcohol, isopropyl alcohol, n-butyl alcohol, sec-butyl alcohol, t-butyl alcohol, or isobutyl alcohol. The ketone-based solvent may be acetone, methyl ethyl ketone, diethyl ketone, or diacetone alcohol. The ester-based solvent may be methyl acetate, ethyl acetate, or ethyl lactate. The polyhydric alcohol-based solvent may be ethylene glycol, diethylene glycol, triethylene glycol, propylene glycol, butylene glycol, 1,4-butanediol, 1,2,4-butane triol, 1,5-pentanediol, 1,6-hexanediol, 1,2,6-hexanetriol, hexylene glycol, glycerol, glycerol ethoxylate, or trimethylolpropane ethoxylate. A monohydric alcohol used as an organic solvent adjusts the surface tension of ink, and thus can improve penetrability, dot forming ability, and drying properties of a printed image on a recoding medium such as a regular paper sheet or a high grade paper sheet. In addition, polyhydric alcohols and derivatives thereof do not easily evaporate and reduce the freezing point of ink, thereby improving the storage stability of ink. As a result, the clogging of nozzles is prevented.

Examples of the nitrogen-containing solvent which can be used as the organic solvent may include 2-pyrolidone and N-methyl-2-pyrolidone. The sulfur-containing solvent may be dimethyl sulfoxide, tetramethylenesulfone, or thioglycol.

When the organic solvent as described above is used with a water-based solvent such as water, the amount of organic solvent may be 0.1-130 parts by weight, and preferably 10-50 parts by weight, with respect to 100 parts by weight of water. When the amount of organic solvent is less than 0.1 parts by weight with respect to 100 parts by weight of water, the surface tension of ink may be increased. When the amount of organic solvent is greater than 130 parts by weight with respect to 100 parts by weight of water, the viscosity of ink may be increased, so that the ejection properties of ink suffer.

An ink composition may further include various additives in order to enhance properties of the ink composition. In particular, the additives may be at least one additive selected from the group consisting of a wetting agent, a dispersant, a surfactant, a viscosity modifier, a pH controlling agent, and an antioxidant. The amount of all additives may be 0.5-600 parts by weight, and preferably 10-300 parts by weight, with respect to 100 parts by weight of the colorant. When the amount of additives is less than 0.5 parts by weight with respect to 100 parts by weight of the colorant, the performance of the ink is not improved. When the amount of additives is greater than 600 parts by weight with respect to 100 parts by weight of the colorant, the storage stability of ink may be reduced.

In particular, the surfactant used as the additive is not particularly limited, and may be appropriately selected corresponding to the purpose of use. For example, the surfactant may be an ampholytic surfactant, an anionic surfactant, a cationic surfactant, a non-ionic surfactant, or the like. The surfactant may be used alone, or in combination of two or more.

The ampholytic surfactant may be alanine, dodecyldi(aminoethyl)glycine, di(octylaminoethyl)glycine, N-alkyl-N,N-dimethylammoniumbetaine, or the like.

The anionic surfactant may be an alkylbenzenesulfonic acid salt, an α-olefinesulfonic acid salt, a polyoxyethylene alkyl ether acetic acid salt, phosphate ester, or the like.

The cationic surfactant may be an amine salt type surfactant, such as an alkyl amine salt, an amino alcohol fatty acid derivative, a polyamine fatty acid derivative, imidazoline, or the like, or a quaternary ammonium salt type surfactant, such as an alkyltrimethyl ammonium salt, a dialkyldimethyl ammonium salt, an alkyldimethylbenzyl ammonium salt, a pyridinium salt, an alkylisoquinolinium salt, and benzethonium chloride.

The non-ionic surfactant may be a polyoxyethylene alkyl ether surfactant, a polyoxyethylene alkyl phenyl ether surfactant, an acetylene glycol surfactant, or the like.

Among the surfactants described above, the non-ionic surfactant is preferably used due to its antifoaming characteristics.

The non-ionic surfactant may be preferably a SURFYNOL series manufactured by Air Products, which have an acetylenic ethoxylated diol structure, a TERGITOL series manufactured by Union Carbide, which have a polyethylene oxide or polypropylene oxide structure, a Tween series having a polyoxyethylene sorbitan fatty acid ester structure, or the like.

To provide an optimal state of use, the ink composition may have a surface tension of 15-70 dyne/cm, preferably 25-55 dyne/cm at 20° C., and may have a viscosity of 1-20 cps, preferably 1.5-3.5 cps at 20° C. When the surface tension of the ink composition is beyond these ranges, the printing performance of the ink composition may be degraded. When the viscosity of the ink composition is beyond these ranges, the ink composition may not be satisfactorily ejected.

An ink set may use at least two ink compositions having different compositions from each other, each of the ink compositions being constituted by the above-described ink composition.

The ink set may be supplied to an ink accommodation unit or inkjet printer cartridge of an inkjet recording device. An inkjet recording device may include a thermal head in which ink droplets are ejected using water vapor pressure generated by heating an ink composition, a piezo head in which ink droplets are ejected using a piezo device, a disposable head, or a permanent head. In addition, the inkjet recording device may be a scanning type printer or an array type printer, and can be used for desktop, textile, and for industrial purposes. The head types, printer types and uses of the inkjet recording device have been described only for more detailed description. In addition, the ink composition is not restricted to use in the inkjet recording device as described above, and can also be used in various other inkjet recording devices.

Figure 2:
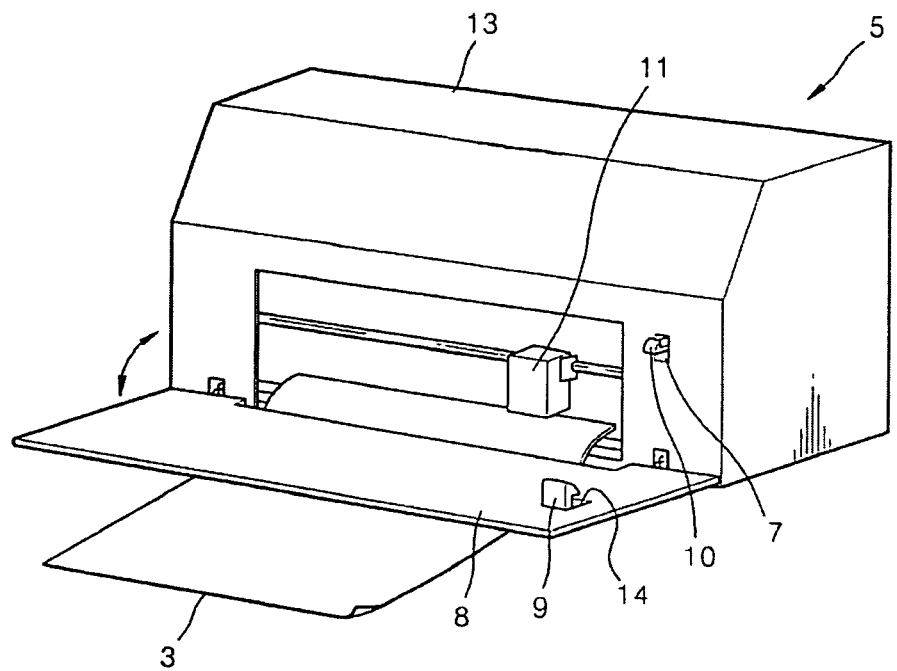
FIG. 2 is a perspective view of an inkjet recording device including an ink cartridge.

FIG. 2 is a perspective view of an inkjet recording device including an ink cartridge.

Referring to FIG. 1, the inkjet recording device includes an inkjet printer cartridge 11 which includes an ink composition including a large chromophore containing colorant and a colorant-like additive. A printer cover 8 is connected to a body 13 of a printer 5. An engaged region of a movable latch 10 protrudes through a hole 7. The movable latch 10 is engaged with a fixed latch 9. When the printer cover 8 is closed, the movable latch 10 is engaged with the fixed latch 9, and the fixed latch 9 contacts the movable latch 10 inside of the printer cover 8. The printer cover 8 has a recess 14 corresponding to the engaged portion of the movable latch 10 which protrudes through the hole 7. The inkjet printer cartridge 11 is positioned such that ink is dropped on a sheet of paper 3 passing under the ink cartridge 11.

Figure 3:
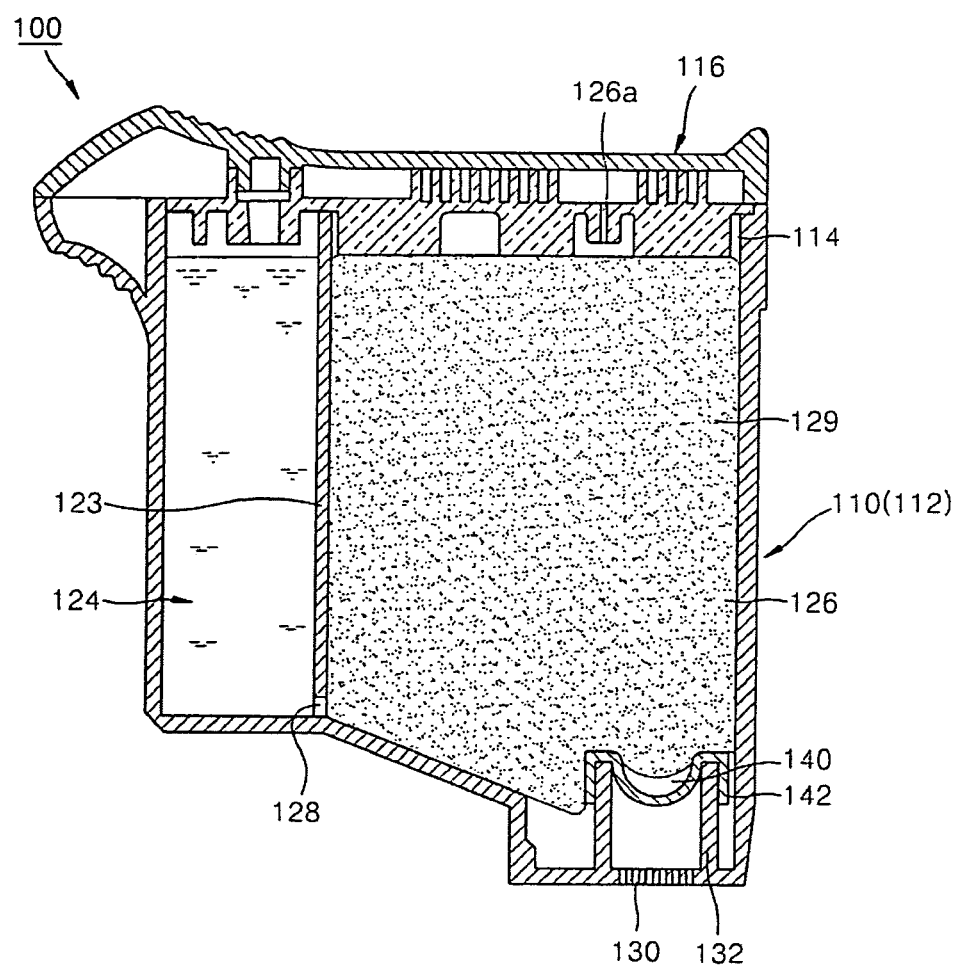
FIG. 3 is a cross sectional view of an ink cartridge.

FIG. 3 is a cross sectional view of an inkjet printer cartridge 100 including the ink set. Referring to FIG. 3, the inkjet printer cartridge 100 includes an ink cartridge body 110 forming an ink container 112, an inner cover 114 covering the ink container 112, and an outer cover 116 separated from the inner cover 114 by a predetermined distance to seal the ink container 112 and the inner cover 114.

The ink container 112 is divided into a first chamber 124 and a second chamber 126 by a vertical barrier 123. An ink passage 128 between the first chamber 124 and the second chamber 126 is formed at the lowest portion of the vertical barrier 123. The first chamber 124, a sponge 129, and the second chamber 126 are sequentially filled with ink. A vent hole 126a corresponding to the second chamber 126 is formed on the inner cover 114.

A filter 140 is located in a lower portion of the second chamber 126 to filter the impurities and fine bubbles of ink so as to prevent ejection holes of a printer head 130 from being clogged. A hook 142 is located on an edge of the filter 140 and on a higher portion of a standpipe 132. Ink is ejected in the form of droplets to a printing medium from the ink container 112 through the ejection holes of a printer head 130.

Further detail with reference to the following examples is provided below. These examples are for illustrative purpose only and are not intended to limit the scope.

Preparation of Capsulated Colorant Using Basic Monomer

Examples 1-1 through 1-4

Change in Amount of Basic Monomer (For Example: 2-vinylpyridine)

Each of a number of capsulated colorants was prepared by using a method that is described hereinafter with compositions shown in Table 1.

A quantitated carbon black dispersion solution (Table 1 below shows the net amount of carbon black added) was added to a reactor, 90 g of water was added to the reactor, and then a quantitated surfactant, i.e., sodium dodecylsulfate (SDS) was added to the reactor. Then, the mixture was dispersed by stirring. A quantitated monomer mixed solution was then added to the mixture and emulsified by ultrasonic waves or stirring for 5 minutes. At this time, the amount of basic monomer, i.e., 2-vinylpyridine was changed in a range of 5-75% with respect to a total mass of polymerizable unsaturated monomers, i.e., styrene and butylacrylate. When the temperature of the reactor was raised in a nitrogen atmosphere and reached a polymerization temperature of 80° C., a solution in which an initiator (potassium persulfate (KPS)) was dissolved in 10 g of water was added to the reactor to start polymerization. The polymerization was performed at a stirring speed of 350 rpm for 24 hours in a nitrogen atmosphere to prepare a capsultated colorant.

An average particle size of the prepared capsulated colorant was measured using a particle size analyzer (manufacturer: Otsuka, product name: ELS-Z2 plus). Then, the capsulated colorant was dried, and morphology thereof was analyzed using TEM (manufacturer: Japan Electronic Optics Laboratory (JEOL), product name: JEM-200CX).

Figure 4:
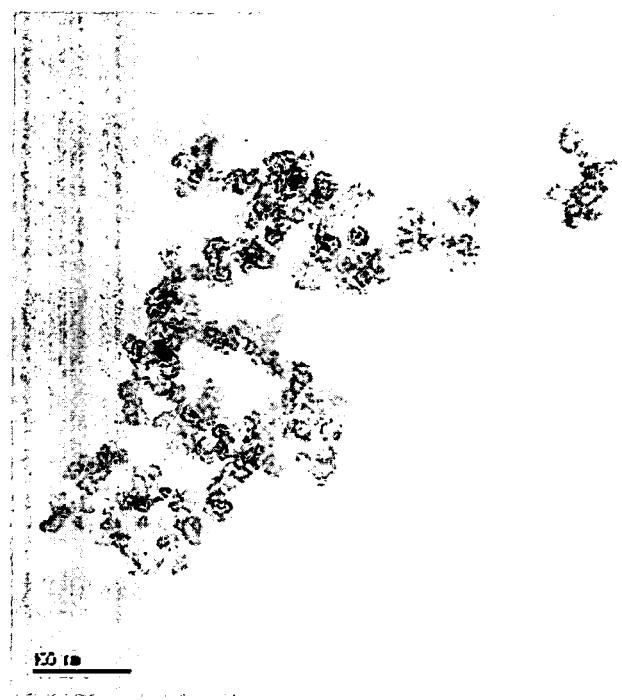
FIG. 4 is a transmission electron microscopic (TEM) image of a capsulated colorant prepared in Example 1-2.
Figure 5:
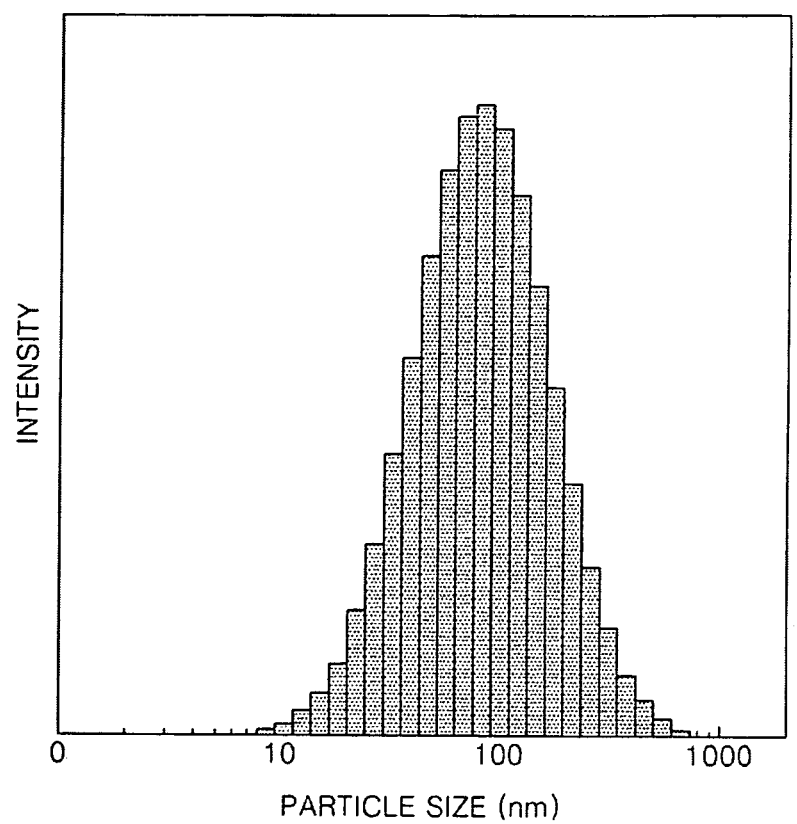
FIG. 5 is a graph showing particle size distribution of a capsulated colorant of Example 1-2.

Among the prepared capsulated colorants, a transmission electron microscopic (TEM) image and particle size distribution (average particle size: 104.1 nm) of the capsulated colorant of Example 1-2 are respectively illustrated in FIGS. 4 and 5.

TABLE 1

|  | Example 1-1 | Example 1-2 | Example 1-3 | Example 1-4 |
|---|---|---|---|---|
| Carbon black (g) | 10 | 10 | 10 | 10 |
| Styrene (g) | 2.22 | 2.22 | 2.22 | 2.22 |
| Butyl acrylate (g) | 2.22 | 2.22 | 2.22 | 2.22 |
| 2-vinylpyridine (g) | 0.22 | 0.44 | 1.34 | 3.33 |
| KPS (g) | 0.046 | 0.048 | 0.053 | 0.058 |
| Water (g) | 100 | 100 | 100 | 100 |
| SDS (g) | 0.2 | 0.2 | 0.2 | 0.2 |

Examples 1-5 through 1-8

Change in Amount of Carbon Black to Monomer

Each of a number of capsulated colorants was prepared by using a method that is described hereinafter with compositions shown in Table 2.

A quantitated carbon black dispersion solution (Table 2 below shows the net amount of carbon black added) was added to a reactor, 90 g of water was added to the reactor, and then a quantitated surfactant SDS was added to the reactor. Then, the mixture was dispersed by stirring. A quantitated monomer mixed solution was then added to the mixture and emulsified by ultrasonic waves or stirring for 5 minutes. At this time, a weight ratio of carbon black to monomer was changed to be in a range of 1:1 to 2.5:1, and an amount of an initiator was changed corresponding to the changed amount of monomer (the amount of initiator: 1 wt % with respect to the weight of the monomer). When the temperature of the reactor was raised in a nitrogen atmosphere and reached a polymerization temperature of 80° C., a solution in which an initiator (KPS) was dissolved in 10 g of water was added to the reactor to start polymerization. The polymerization was performed at a stirring speed of 350 rpm for 24 hours in a nitrogen atmosphere to prepare a capsultated colorant.

Figure 6:
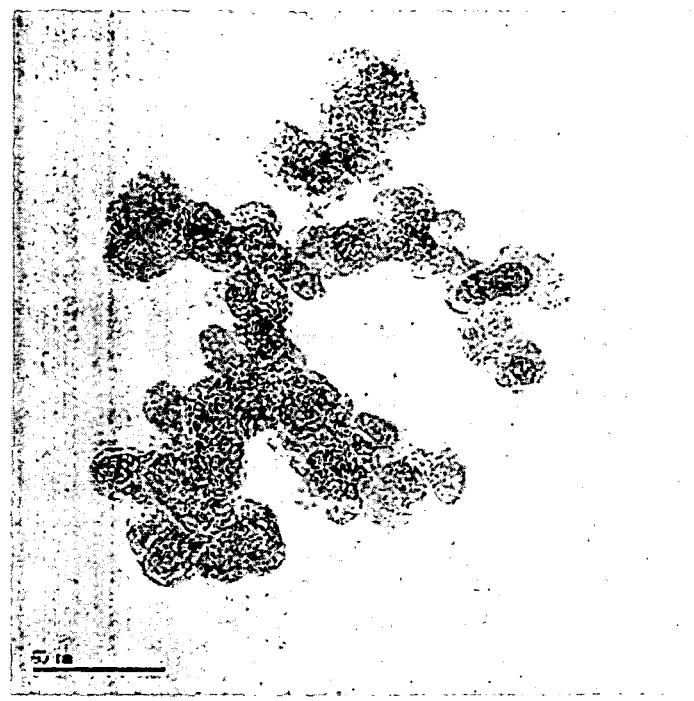
FIG. 6 is a TEM image of a capsulated colorant of Example 1-6.
Figure 7:
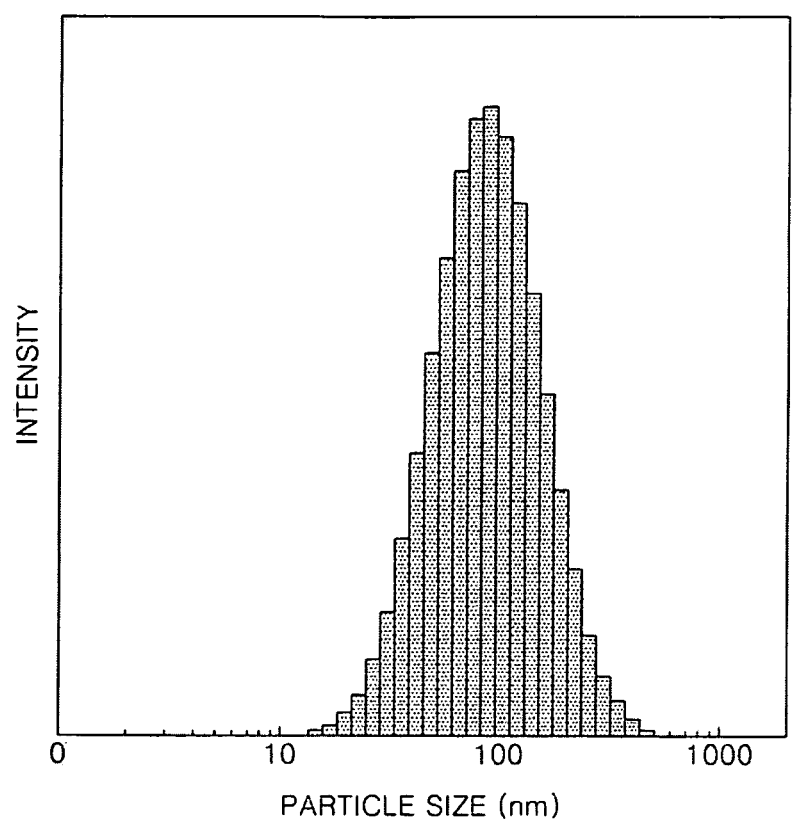
FIG. 7 is a graph showing particle size distribution of a capsulated colorant of Example 1-6.

Among the prepared capsulated colorants, a transmission electron microscopic (TEM) image and particle size distribution (average particle size: 101.7 nm) of the capsulated colorant of Example 1-6 are respectively illustrated in FIGS. 6 and 7.

TABLE 2

|  | Example 1-5 | Example 1-6 | Example 1-7 | Example 1-8 |
|---|---|---|---|---|
| Carbon black (g) | 10 | 10 | 10 | 10 |
| Styrene (g) | 4.44 | 2.96 | 2.22 | 1.78 |
| Butyl acrylate (g) | 4.44 | 2.96 | 2.22 | 1.78 |
| 2-vinylpyridine (g) | 1.1 | 0.67 | 0.54 | 0.44 |
| KPS (g) | 0.1 | 0.066 | 0.05 | 0.04 |
| Water (g) | 100 | 100 | 100 | 100 |
| SDS (g) | 0.2 | 0.2 | 0.2 | 0.2 |

Examples 1-9 through 1-12

Change in Type of Basic Monomer (Amount was Fixed)

Each of a number of capsulated colorants was prepared by using a method that is described hereinafter with compositions shown in Table 3.

A quantitative carbon black dispersion solution (Table 3 shows the net amount of carbon black added) as added reactor, 90 g of water was added to the reactor, and then a quantitated surfactant SDS was added to the reactor. Then, the mixture was dispersed by stirring. A quantitative monomer mixed solution was then added to the mixture and emulsified by ultrasonic waves or stirring for 5 minutes. At this time, the amount of basic monomer used was fixed, and types of the basic monomer for Examples 1-9 through 1-12 were respectively 2-vinylpyridine (2-vp), 4-vinylpyridine (4-vp), acrylamide (AAm), and N,N-dimethylaminoethylmethacrylate (DMAEMA). When the temperature of reactor was raised in a nitrogen atmosphere and reached a polymerization temperature of 80° C., a solution in which an initiator (KPS) was dissolved in 10 g of water was added to the reactor to start polymerization. The polymerization was performed at a stirring speed of 350 rpm for 24 hours under nitrogen atmosphere to prepare a capsultated colorant.

Figure 8:
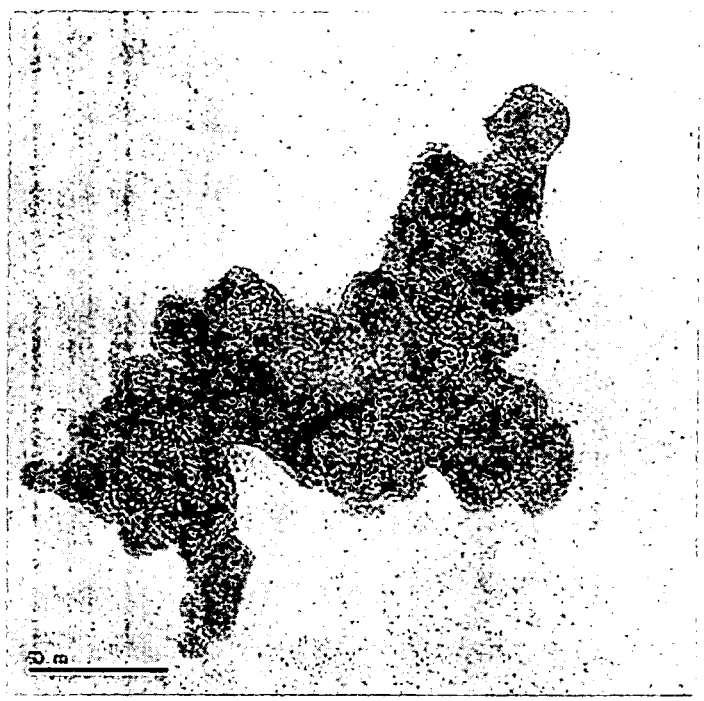
FIG. 8 is a TEM image of a capsulated colorant of Example 1-12.
Figure 9:
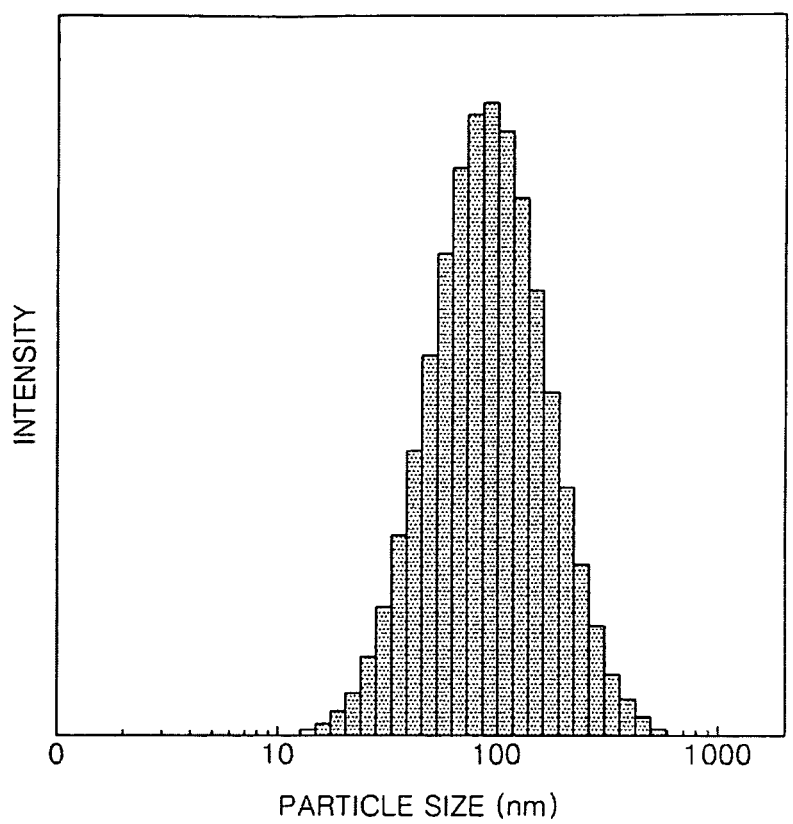
FIG. 9 is a graph showing particle size distribution of a capsulated colorant of Example 1-12.

Among the prepared capsulated colorants, a transmission electron microscopic (TEM) image and particle size distribution (average particle size: 109.2 nm) of the capsulated colorant of Example 1-12 are respectively illustrated in FIGS. 8 and 9.

TABLE 3

|  | Example 1-9 | Example 1-10 | Example 1-11 | Example 1-12 |
|---|---|---|---|---|
| Carbon black (g) | 10 | 10 | 10 | 10 |
| Styrene (g) | 2.22 | 2.22 | 2.22 | 2.22 |
| Butyl acrylate (g) | 2.22 | 2.22 | 2.22 | 2.22 |
| 2-vinylpyridine (g) | 0.54 | — | — | — |
| 4-vinylpyridine (g) | — | 0.54 | — | — |
| Acrylamide (g) | — | — | 0.54 | — |
| N,N-dimethyl amino ethyl methacrylate (g) | — | — | — | 0.54 |
| KPS (g) | 0.05 | 0.05 | 0.05 | 0.05 |
| Water (g) | 100 | 100 | 100 | 100 |
| SDS (g) | 0.2 | 0.2 | 0.2 | 0.2 |

Examples 1-13 through 1-15

Change in Type of Surfactant

Each of a number of capsulated colorants was prepared by using a method that is described hereinafter with compositions shown in Table 4 below.

TABLE 4

|  | Example 1-13 | Example 1-14 | Example 1-15 |
|---|---|---|---|
| Carbon black (g) | 10 | 10 | 10 |
| Styrene (g) | 2.22 | 2.22 | 2.22 |
| Butyl acrylate (g) | 2.22 | 2.22 | 2.22 |
| 2-vinylpyridine (g) | 0.54 | 0.54 | 0.54 |
| KPS (g) | 0.05 | 0.05 | 0.05 |
| Water (g) | 100 | 100 | 100 |
| SDS (g) | 0.2 | — | — |
| NaDDBs (g) | — | 0.04 | — |
| CTAB (g) | — | — | 0.04 |

Preparation of Capsulated Colorant without Using Basic Monomer

Comparative Examples 1-1 through 1-9

Capsulated colorants were prepared in the same manner as in Example 1-1, except that each capsulated colorant was prepared without using a basic monomer, with compositions shown in Table 5, below. Compositions of Comparative Examples are shown in Table 5 below.

TABLE 5

|  | Comp. Ex. 1-1 | Comp. Ex. 1-2 | Comp. Ex. 1-3 | Comp. Ex. 1-4 | Comp. Ex. 1-5 | Comp. Ex. 1-6 | Comp. Ex. 1-7 | Comp. Ex. 1-8 | Comp. Ex. 1-9 |
|---|---|---|---|---|---|---|---|---|---|
| Carbon black (g) | 10.0 | 10.0 | 10.0 | 10.0 | 10.0 | 10.0 | 10.0 | 0.0 | 10.0 |
| Styrene (g) | 2.2 | 4.4 | 3.0 | 2.2 | 1.8 | 2.2 | 2.2 | 2.2 | 2.2 |
| Butyl acrylate (g) | 2.2 | 4.4 | 3.0 | 2.2 | 1.8 | 2.2 | 2.2 | 2.2 | 2.2 |
| KPS (g) | 0.0 | 0.1 | 0.1 | 0.1 | 0.0 | 0.1 | 0.1 | 0.1 | 0.1 |
| Water (g) | 100.0 | 100.0 | 100.0 | 100.0 | 100.0 | 100.0 | 100.0 | 100.0 | 100.0 |
| SDS (g) | 0.2 | 0.2 | 0.2 | 0.2 | 0.2 | 0.2 | 0.2 | 0.0 | 0.0 |
| NaDDBs (g) | 0.0 | 0.0 | 0.0 | 0.0 | 0.0 | 0.0 | 0.0 | 0.04 | 0.0 |
| CTAB (g) | 0.0 | 0.0 | 0.0 | 0.0 | 0.0 | 0.0 | 0.0 | 0.0 | 0.04 |

A quantitative carbon black dispersion solution (Table 4 below shows the net amount of carbon black added) was added to a reactor, 90 g of water was added to the reactor, and then a quantitated surfactant SDS was added to the reactor. Then, the mixture was dispersed by stirring. A quantitated monomer mixed solution was then added to the mixture and emulsified by ultrasonic waves or by stirring for 5 minutes. At this time, types of the surfactant used were an anionic SDS, sodium dodecylbenzene sulfonate (NaDDBS), and cationic cetyltrimethylammonium bromide (CTAB). In addition, the amount of each surfactant was quantitated by being calculated as a critical micelle concentration (CMC). 2-vinylpyridine (2-vp) was used as a basic monomer. When the temperature of the reactor was raised in a nitrogen atmosphere and reached a polymerization temperature of 80° C., a solution in which an initiator (KPS) was dissolved in 10 g of water was added to the reactor to start polymerization. The polymerization was performed at a stirring speed of 350 rpm for 24 hours under nitrogen atmosphere to prepare a capsultated colorant.

Figure 10:
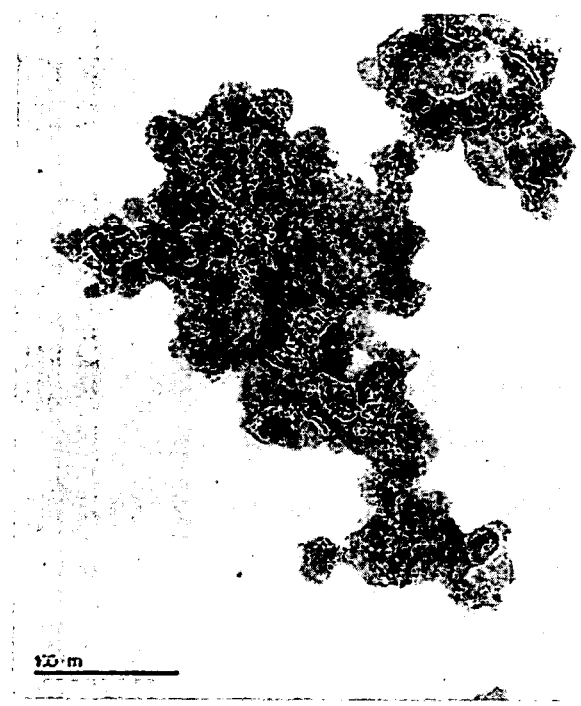
FIG. 10 is a TEM image of a capsulated colorant of Example 1-15.
Figure 11:
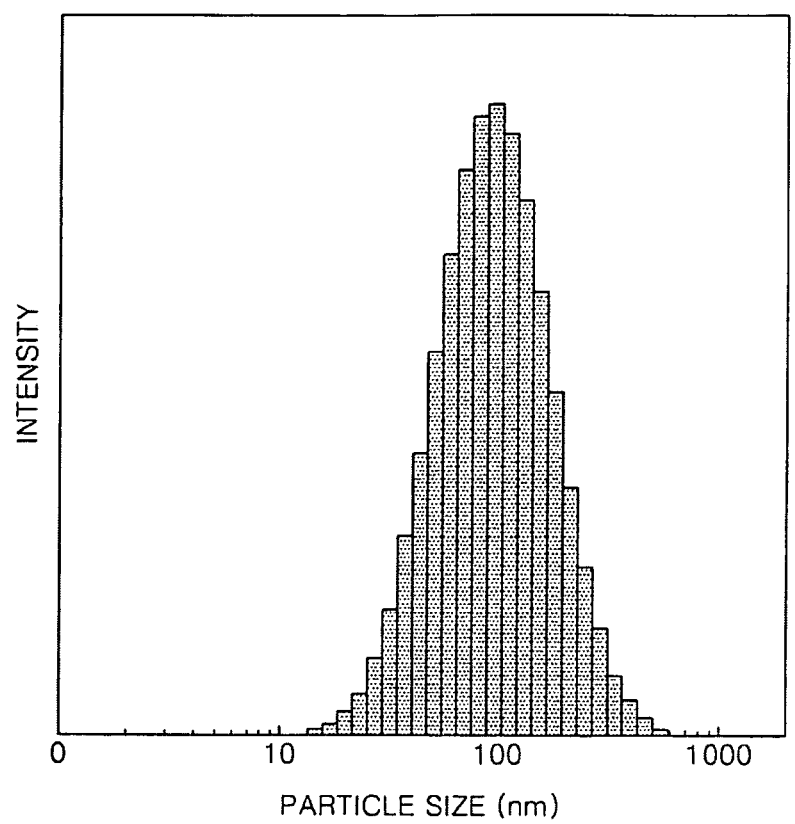
FIG. 11 is a graph showing particle size distribution of a capsulated colorant of Example 1-15.

Among the prepared capsulated colorants, a transmission electron microscopic (TEM) image and particle size distribution (average particle size: 110.1 nm) of the capsulated colorant of Example 1-15 are respectively illustrated in FIGS. 10 and 11.

Preparation of Ink Composition

The capsulated colorants prepared in Examples 1-1 through 1-15, water, an organic solvent, and additives were mixed with compositions described as below. Then, each mixture was fully stirred for at least 30 minutes in a stirrer to make the mixtures uniform. Thereafter, the mixture was passed through a 0.45 µm filter to prepare ink compositions of Examples 2-1 through 2-15.

Examples 2-1 through 2-15

| Capsulated colorants of Examples 1-1 through 1-15 | 4.5 parts by weight |
|---|---|
| Glycerol | 7.5 parts by weight |
| Diethylene glycol | 8 parts by weight |
| Water (deionized water) | 80 parts by weight |

The capsulated colorants prepared in Comparative. Examples 1-1 through 1-9, water, an organic solvent, and additives were mixed with compositions described as below. Then, each mixture was fully stirred for at least 30 minutes in a stirrer to make the mixtures uniform. Thereafter, the mixture was passed through a 0.45 μm filter to prepare ink compositions of Comparative Examples 2-1 through 2-9.

Comparative Examples 2-1 through 2-9

| | |
|---|---|
| Capsulated colorants of Comparative Examples 1-1 through 1-9 | 4.5 parts by weight |
| Glycerol | 7.5 parts by weight |
| Diethylene glycol | 8 parts by weight |
| Water (deionized water) | 80 parts by weight |

Experimental Example 1

Test of Storage Stability of Ink Cartridge

The extent to which ink was not ejected due to nozzle clogging of ink when printing after the ink compositions prepared in Examples 2-1 through 2-15 and Comparative Examples 2-1 through 2-9 were left in a Samsung ink cartridge at room temperature (25° C.) and at a low temperature (−5° C.) for 2 weeks each was evaluated, and the results are shown in Table 6.
  ⊚: clogging of 5% or less of the nozzles was observed
  F: clogging of 6-10% of the nozzles was observed
  Δ: clogging of 11-20% of the nozzles was observed
  X: clogging of 21% or greater of the nozzles was observed Experimental Example 2

Test of Storage Stability of Ink

Viscosity of each of the ink compositions prepared in Examples 2-1 through 2-15 and Comparative Examples 2-1 through 2-9 after being left in a Samsung ink cartridge at a high temperature (60° C.) and in freezing conditions (−18° C.) for 4 weeks each was compared with an initial viscosity of each ink composition. A change in the viscosity was evaluated as detailed below, and the results are shown in Table 6.
  ⊚: average viscosity change of 5% or less
  F: average viscosity change of 6-10%
  Δ: average viscosity change of 11-20%
  X: average viscosity change of 21% or greater Experimental Example 3

Rubfastness Test

The ink compositions prepared in Examples 2-1 through 2-15 and Comparative Examples 2-1 through 2-9 were refilled in Ink Cartridge M-50 (manufactured by Samsung) and then an image of a bar picture (2*10 cm) was printed in a printer (MJC-3300p, manufactured by Samsung). Thereafter, the printed image was dried for 24 hours. When rubbing the image 5 times using a tester, optical density (OD) of the image transferred from the bar picture was compared to the OD of the image of the bar picture before rubbing and was expressed in percentage. The results are shown in Table 6.
A=(OD of the image after rubbing)/(OD of the image before rubbing)×100(%)
  ⊚: A<15
  F: 15≦A<30
  Δ: 30≦A≦45
  X: A>45

Experimental Example 4

Waterfastness Test

The ink compositions prepared in Examples 2-1 through 2-15 and Comparative Examples 2-1 through 2-9 were refilled in Ink Cartridge M-50 (manufactured by Samsung) and then an image of a bar picture (2*10 cm) was printed in a printer (MJC-2400C, manufactured by Samsung). After 5 minutes, 5 water drops were in the printed image and the image was dried for 24 hours. OD of the bar picture decreased while water flowed down thereon was compared to OD of the original bar picture prior to the water pouring and was expressed in percentage. The results were evaluated as follows and are shown in Table 6 below.
A=(OD of the image after water flowed down thereon/OD of the original bar picture prior to the water pouring)×100(%)
  ⊚: 95≦A
  F: 90≦A<95,
  X: 85≦A<90
  X: A<85

Experimental Example 4

Optical Density (OD) Test

The ink compositions prepared in Examples 2-1 through 2-15 and Comparative Examples 2-1 through 2-9 were refilled in Ink Cartridge M-50 (manufactured by Samsung) and then a bar picture image (2*10 cm) was printed in a printer (MJC-3300p, manufactured by Samsung). Thereafter, the printed image was dried for 24 hours. Optical densities of the ink compositions were measured as follows using a tester. The results are shown in Table 6.
A=OD of images
  ⊚: A≧1.4
  F: 1.2≦A<1.4
  Δ: 1.0≦A<1.2
  X: A<1.0

TABLE 6

| | Cartridge storage stability | Ink storage stability | Rubfastness | Waterfastness | Optical density |
|---|---|---|---|---|---|
| Example 2-1 | ⊚ | ⊚ | ⊚ | ⊚ | ⊚ |
| Example 2-2 | ⊚ | F | ⊚ | ⊚ | ⊚ |
| Example 2-3 | ⊚ | ⊚ | ⊚ | F | F |
| Example 2-4 | ⊚ | Δ | ⊚ | ⊚ | F |
| Example 2-5 | F | ⊚ | ⊚ | ⊚ | ⊚ |
| Example 2-6 | ⊚ | F | F | ⊚ | Δ |
| Example 2-7 | F | ⊚ | ⊚ | ⊚ | ⊚ |
| Example 2-8 | ⊚ | F | ⊚ | ⊚ | ⊚ |
| Example 2-9 | ⊚ | ⊚ | ⊚ | F | F |
| Example 2-10 | ⊚ | F | ⊚ | ⊚ | ⊚ |
| Example 2-11 | F | ⊚ | ⊚ | ⊚ | ⊚ |
| Example 2-12 | ⊚ | ⊚ | ⊚ | ⊚ | F |
| Example 2-13 | ⊚ | ⊚ | ⊚ | ⊚ | Δ |
| Example 2-14 | ⊚ | F | ⊚ | ⊚ | ⊚ |
| Example 2-15 | ⊚ | ⊚ | ⊚ | F | ⊚ |
| Comparative Example 2-1 | Δ | X | ⊚ | ⊚ | F |
| Comparative Example 2-2 | X | Δ | ⊚ | ⊚ | F |
| Comparative Example 2-3 | F | X | F | ⊚ | ⊚ |
| Comparative Example 2-4 | Δ | X | ⊚ | F | Δ |

TABLE 6-continued

| | Cartridge storage stability | Ink storage stability | Rub-fastness | Water-fastness | Optical density |
|---|---|---|---|---|---|
| Comparative Example 2-5 | X | F | ◎ | ◎ | ◎ |
| Comparative Example 2-6 | Δ | X | ◎ | F | ◎ |
| Comparative Example 2-7 | Δ | X | ◎ | ◎ | F |
| Comparative Example 2-8 | X | F | F | ◎ | Δ |
| Comparative Example 2-9 | F | Δ | ◎ | F | ◎ |

As shown in Table 6, the ink compositions of Examples 2-1 through 2-15, each including the capsulated colorant prepared using the basic monomer, have superior cartridge storage stability, ink storage stability and superior waterfastness, rubfastness and optical density, compared with the ink compositions of Comparative Examples 2-1 through 2-9, which do not include the basic monomer.

This may be because a surface of the colorant can be effectively coated with a polymer resin by using electrostatic interaction between the surface of the colorant having a negative charge and the basic monomer having a positive charge, and the amount of polymer resin that does not coat the colorant but is polymerized independently, is decreased.

The surface of the colorant having a negative charge and the basic monomer having a positive charge are reacted using electrostatic interaction to coat the surface of the colorant with a polymer resin. A capsulated colorant results. Printed images with improved waterfastness, lightfastness, rubfastness, and optical density are obtained. Characteristics of the ink composition including the capsulated colorant, such as prevention of nozzle clogging of ink, ink storage stability, and the like are also realized.

While the structures and compositions have been particularly shown and described with reference to exemplary embodiments thereof, it will be understood by those of ordinary skill in the art that various changes in form and detail may be made without departing from the spirit arid scope as defined by the following claims.

What is claimed is:

1. A capsulated colorant comprising:
a colorant; and
a polymer resin coated on the colorant,
wherein the polymer resin is a result of polymerization of a polymerizable composition comprising a basic monomer having a positive charge and a polymerizable unsaturated monomer,
wherein the polymerizable unsaturated monomer is at least one compound selected from the group consisting of pentadiene, acrylic acid, crotonic acid, fumaric acid, itaconic acid monoethyl ester, fumaric acid monobutyl ester, maleic acid monobutyl ester, methacrylonitrile, methacrylamide, itaconamide and maleic monoamide,
wherein the basic monomer having a positive charge is vinyl-N-methylpyridinium chloride, and
wherein the basic monomer having a positive charge is present in an amount of about 10 to about 50 parts by weight based on 100 parts by weight of the polymerizable unsaturated monomer.

2. A method of preparing a capsulated colorant, the method comprising:
providing a polymerizable composition comprising a basic monomer having a positive charge, a polymerizable unsaturated monomer, an aqueous medium, a colorant, an emulsifying agent, and a polymerization initiator,
wherein the polymerizable unsaturated monomer is at least one compound selected from the group consisting of pentadiene, acrylic acid, crotonic acid, fumaric acid, itaconic acid monoethyl ester, fumaric acid monobutyl ester, maleic acid monobutyl ester, methacrylonitrile, methacrylamide, itaconamide and maleic monoamide,
wherein the basic monomer having a positive charge is vinyl-N-methylpyridinium chloride,
wherein the amount of the basic monomer having a positive charge is present in the amount of about 10 to 50 parts by weight based on 100 parts by weight of the polymerizable unsaturated monomer;
emulsifying the polymerizable composition; and
polymerizing the polymerizable composition on the colorant to form a polymer resin that is coated on the colorant to provide the capsulated colorant.

3. The method of claim 2, wherein the polymerizable composition comprises about 500 to about 5,000 parts by weight of the aqueous medium, about 10 to about 500 parts by weight of the colorant, about 0.1 to about 20 parts by weight of the emulsifying agent, and about 0.1 to about 10 parts by weight of the polymerization initiator, based on 100 parts by weight of the polymerizable unsaturated monomer.

4. An ink composition comprising:
a colorant having a polymer resin coated thereon; and
a solvent,
wherein the polymer resin is a result of polymerization of a polymerizable composition comprising a basic monomer having a positive charge and a polymerizable unsaturated monomer,
wherein the polymerizable unsaturated monomer is at least one compound selected from the group consisting of pentadiene, acrylic acid, crotonic acid, fumaric acid, itaconic acid monoethyl ester, fumaric acid monobutyl ester, maleic acid monobutyl ester, methacrylonitrile, methacrylamide, itaconamide and maleic monoamide,
wherein the basic monomer having a positive charge is vinyl-N-methylypyridinium chloride, and
wherein the basic monomer having a positive charge is present in the amount of about 10 to about 50 parts by weight based on 100 parts by weight of the polymerizable unsaturated monomer.

5. The ink composition of claim 4, comprising about 1 to about 20 parts by weight of the capsulated colorant with respect to 100 parts by weight of the ink composition and about 80 to about 99 parts by weight of the solvent with respect to 100 parts by weight of the ink composition.

6. The ink composition of claim 4, wherein the solvent comprises water and at least one organic solvent selected from the group consisting of: a monohydric alcohol-based solvent, a ketone-based solvent, an ester-based solvent, a polyhydric alcohol-based solvent, a nitrogen-containing solvent, and a sulfur-containing solvent.

7. The ink composition of claim 4, having a surface tension of about 15 to about 70 dyne/cm at about 20° C. and a viscosity of about 1 to about 20 cps at 20° C.

8. An ink set comprising: at least two ink compositions, the ink composition comprising:
a colorant having a polymer resin coated thereon; and
a solvent,
wherein the polymer resin is a result of polymerization of a polymerizable composition comprising a basic monomer having a positive charge and a polymerizable unsaturated monomer, wherein the polymerizable unsaturated monomer is at least one compound selected from the group consisting of pentadiene, acrylic acid, crotonic acid, fumaric acid, itaconic acid monoethyl ester, fumaric acid monobutyl ester, maleic acid monobutyl ester, methacrylonitrile, methacrylamide, itaconamide and maleic monoamide, wherein the basic monomer having a positive charge is vinyl-N-methylpyridinium chloride, and wherein the basic monomer having a positive charge is present in an amount of about 10 to about 50 parts by weight based on 100 parts by weight of the polymerizable unsaturated monomer.

9. A cartridge for an inkjet recording device, comprising the ink set according to claim 8.

10. An inkjet recording device comprising the cartridge for an inkjet recording device according to claim 9.

* * * * *

UNITED STATES PATENT AND TRADEMARK OFFICE
CERTIFICATE OF CORRECTION

PATENT NO. : 8,420,713 B2
APPLICATION NO. : 12/270438
DATED : April 16, 2013
INVENTOR(S) : Jong-In Lee et al.

Page 1 of 1

It is certified that error appears in the above-identified patent and that said Letters Patent is hereby corrected as shown below:

In the Specifications

Column 1, Line 8, Delete "2008." and insert -- 2008, --, therefor.

In the Claims

Column 16, Line 41, In Claim 4, delete "methylypyridinium" and insert -- methylpyridinium" --, therefor.

Signed and Sealed this
Fifteenth Day of October, 2013

Teresa Stanek Rea
*Deputy Director of the United States Patent and Trademark Office*